(12) United States Patent  
Bunch

(10) Patent No.: US 8,274,563 B1  
(45) Date of Patent: Sep. 25, 2012

(54) MOBILE SECURITY MONITORING SYSTEM AND ASSOCIATED METHOD

(76) Inventor: Timothy Bunch, Hephziban, GA (US)

( * ) Notice: Subject to any disclaimer, the term of this patent is extended or adjusted under 35 U.S.C. 154(b) by 1076 days.

(21) Appl. No.: 12/228,837

(22) Filed: Aug. 15, 2008

Related U.S. Application Data

(60) Provisional application No. 60/964,807, filed on Aug. 16, 2007.

(51) Int. Cl.
*H04N 7/18* (2006.01)
(52) U.S. Cl. ...................................................... 348/158
(58) Field of Classification Search .................. 348/158
See application file for complete search history.

(56) References Cited

U.S. PATENT DOCUMENTS

2006/0274829 A1 * 12/2006 Siemens et al. .......... 375/240.01
* cited by examiner

*Primary Examiner* — John MacIlwinen

(57) ABSTRACT

The portable security monitoring system may include a mechanism for automatically capturing real-time audio and video information of the detected dynamic triggering event in a first location. A plurality or portable real-time audio and video capturing devices may be included at the first location. The system may further include a mechanism for simultaneously playing back the real-time data streams. Such a mechanism preferably includes a portable controller with a hand held device. The hand held device may also include a partitioned display panel provided with a plurality of simultaneously displayed viewing screens. Additionally, a global positioning satellite network may be in communication with the real-time audio and video information capturing mechanism for determining unique location coordinates of the detected dynamic triggering event and further for transmitting the unique location coordinates to the simultaneous playback mechanism respectively.

8 Claims, 14 Drawing Sheets

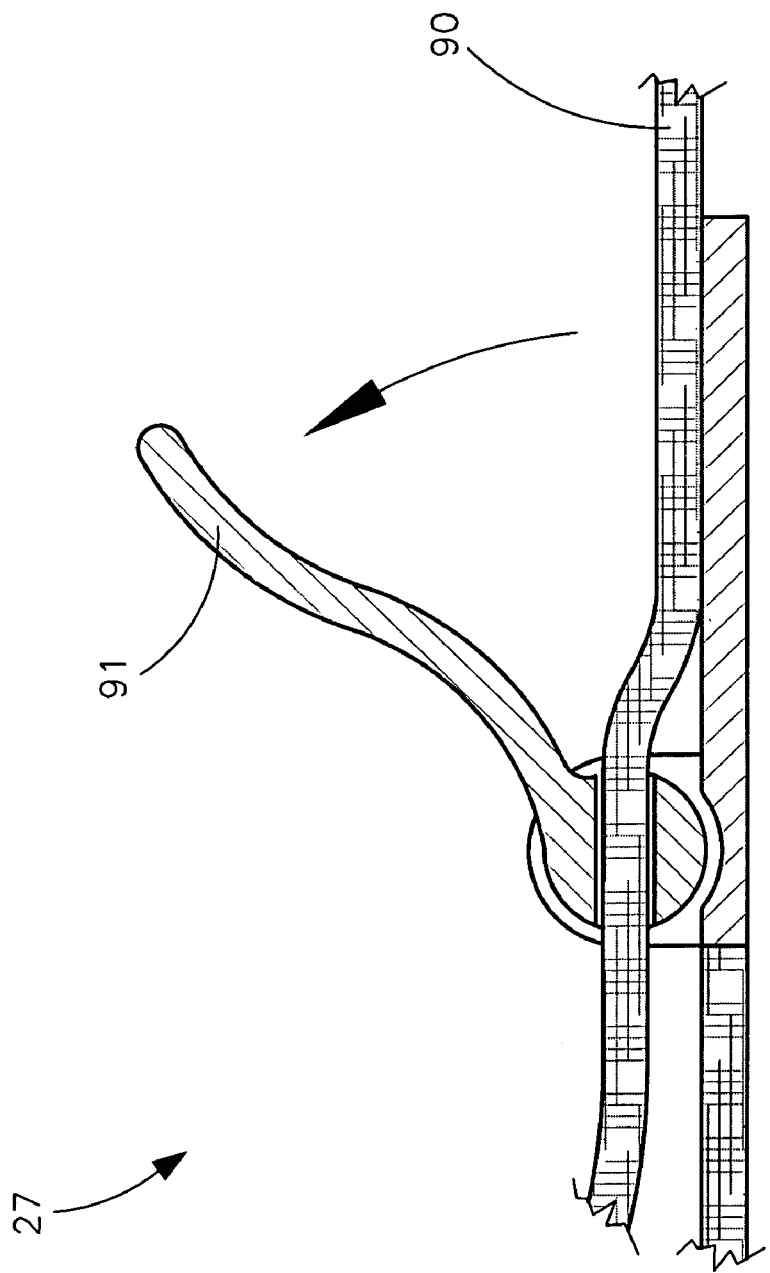

MOBILE SECURITY MONITORING SYSTEM AND ASSOCIATED METHOD

CROSS REFERENCE TO RELATED APPLICATIONS

This application claims the benefit of U.S. Provisional Application No. 60/964,807, filed Aug. 16, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a security systems and, more particularly, to a portable security monitoring system for automatically detecting and tracking a dynamic triggering event occurring proximate to a first location and thereafter wirelessly reporting the dynamic triggering event to a remote second location.

2. Prior Art

Many security systems use door and window units for sensing an intrusion by the opening thereof and a main console to which the door and window units are wired in connection therewith. Many security systems further include key or number pad arming and disarming units on the inside of the door or window. The cost and difficulty involved in installation of such a system is expensive and complex; therefore, security systems have used remote door and window units which transmit radio signals upon the opening thereof. A remote console receives radio signals and will turn an alarm on if the console is in the armed state. Unfortunately, these security systems activate an alarm and alert law enforcement officials even if the alert is a false alarm, such as when a pet activates the security system. Such false alarms may lead to hefty fines and unnecessary disturbances for both the security system owner and the law enforcement officials.

Similar problems arise with automobile security systems. A car alarm may be inadvertently activated by a passing pedestrian. A user may then be forced to inconveniently deactivate the car alarm upon such occurrences. It would be advantageous to employ a means for determining whether a true breech of security has occurred before activating an alarm and alerting law enforcement.

U.S. Pat. No. 6,532,360 to Shaffer discloses a mobile security system for use in an automobile or other vehicle, which activates a cellular phone to automatically dial an emergency telephone number and plays a voice recording that includes position information provided by the vehicle operator. The vehicle operator is prompted to record new position information when the vehicle ignition is turned off. The system can be remotely activated by a wireless transmitter device which generates an RF signal when a "panic button" is depressed. Components of the security system include a cellular telephone, RF receiver device, recording device, and controller. A speaker and microphone permit two-way communication between the vehicle operator and emergency personnel. Unfortunately, this prior art reference does not provide a means of monitoring and locating an automobile.

U.S. Pat. No. 6,262,656 to Byrd discloses a new add-on vehicular system that is capable of responding to large area or nation-wide commands over paging networks, to remotely foil the unauthorized use or theft of a vehicle or a fleet automobile or a group of fleet vehicles, as well as to help the recovery of stolen vehicles. The preferred embodiment of the system is comprised of a paging receiver and decoder, a microcontroller with embedded programmable software, memory, and a vehicular systems control interface. The system does not require central monitoring systems, portable controls, vehicular user set controls, portable key chain controls, keypads, cellular phones, or separation of vehicular transceivers from owner carried transceivers to activate the system. In a second embodiment, a two-way radio paging approach is employed in the system to expand its capabilities and to additionally provide remotely controlled transmission of data from vehicles, including data pertaining to the position coordinates of the vehicle. Unfortunately, this prior art example fails to provide a means of visually monitoring a guarded area or object.

U.S. Pat. No. 6,167,255 to Kennedy discloses a communication system that includes mobile units, a network switching center, and service centers to provide a variety of enhanced services to the mobile units. In one embodiment, a service center communicates menu data to a mobile unit using a voice network. The mobile unit displays user interface menu options generated in response to the menu data communicated by the service center. Selecting a menu option at the user interface enables a function associated with traditional or enhanced services. Unfortunately, this prior art example cannot be adapted to homes other stationary structures.

Accordingly, a need remains for a portable security monitoring system in order to overcome the above-noted shortcomings. The present invention satisfies such a need by providing a system that is convenient and easy to use, lightweight yet durable in design, and designed for automatically detecting and tracking a dynamic triggering event occurring proximate to a first location and thereafter wirelessly reporting the dynamic triggering event to a remote second location.

BRIEF SUMMARY OF THE INVENTION

In view of the foregoing background, it is therefore an object of the present invention to provide a system for automatically detecting and tracking a dynamic triggering event occurring proximate to a first location and thereafter wirelessly reporting the dynamic triggering event to a remote second location. These and other objects, features, and advantages of the invention are provided by a portable security monitoring system.

The portable security monitoring system may include a mechanism for automatically capturing real-time audio and video information of the detected dynamic triggering event. The system may also include a mechanism for parsing the real-time audio and video information into a plurality of independently synchronized real-time data streams uniquely associated with a plurality of corresponding target zones defined at the first location respectively.

The system may further include a mechanism for simultaneously playing back each of the independently synchronized real-time data streams so that the detected dynamic triggering event is displayed from a plurality of unique viewing angles at the remote second location. Such unique viewing angles are preferably associated with corresponding ones of the target zones located at the first location respectively.

The target zones may be mutually exclusive and defined proximate to the first location. The unique viewing angles may be effectively configured in such a manner that a chronological and cumulative view of the target zones is generated for permitting a user in the remote second location to identify real-time developments of the detected dynamic triggering event in the first location.

The automatic real-time audio and video information capturing mechanism preferably includes a plurality of portable real-time audio and video capturing devices removably seated at the first location for simultaneously capturing real-time audio information and real-time low speed video information of the detected dynamic triggering event. Each of such real-time audio and video capturing devices may advantageously maintain a continuous line of sight along a corresponding one of the unique viewing angles so that each of the target zones is monitored during capturing processes. A plurality of sensors may be included for detecting the dynamic triggering event. Such sensors are preferably communicatively coupled to the real-time audio and video capturing devices respectively.

Upon detection of the dynamic triggering event the sensors may automatically generate and transmit an activation signal to the real-time audio and video capturing devices for initializing a corresponding one of the capturing processes at the target zones respectively. Further, a first transceiver may be communicatively coupled to the real-time audio and video capturing devices for transmitting the real-time audio and video information to the real-time audio and video information parsing mechanism.

The real-time audio and video information parsing mechanism may include an intermediary base station disposed at the first location and communicatively coupled to the real-time audio and video capturing devices. Such an intermediary base station may include a second transceiver for receiving the real-time audio and video information from the first transceiver.

The intermediary base station may also include a recording device with a removable computer-readable electronic medium for recording the real-time audio and video information thereon. Further, the base station may include a processor communicatively coupled to the recording device and a memory communicatively coupled to the processor. Such a memory preferably includes programmable software instructions that filter the real-time audio and video information into the independently synchronized real-time data streams.

The software instructions may include and execute a control logic algorithm. Such a control logic algorithm preferably includes the first step of receiving the real-time audio and video information and bifurcating the real-time audio and video information into separate real-time audio and video data streams. The control logic algorithm may include the second step of identifying a total quantity of the target zones by identifying a matching total quantity of the unique viewing angles associated with each of the real-time audio and video data streams respectively.

The control logic algorithm may include the third step of segmenting the real-time audio and video data streams into a plurality of unique real-time audio and video data streams associated with the total quantity of target zones respectively. Further, the control logic algorithm may include the fourth step of chronologically assigning a unique numerical priority code to each of the unique real-time audio and video data streams according to a location of the associated target zones respectively.

Additionally, the control logic algorithm may include the fifth step of independently synchronizing corresponding ones of the unique real-time audio and video data streams by an increasing value of the unique numerical priority codes respectively. Finally, the control logic algorithm may include the sixth step of generating a plurality of output signals including each of the independently synchronized real-time audio and video data streams respectively. Additionally, the second transceiver continuously transmits the output signals to the simultaneous playback mechanism.

The simultaneous playback mechanism preferably includes a service provider communicatively coupled to the real-time audio and video information parsing mechanism for receiving the output signals from the second transceiver. The simultaneous playback mechanism may also include a dedicated wireless communication link associated with the service provider. Further, the simultaneous playback mechanism may include a portable controller located at the remote second location and communicatively coupled to the service provider via the dedicated communication link. The service provider may wirelessly transmit the independently synchronized real-time audio and video data streams over the dedicated communication link to the portable controller.

The portable controller may include a hand-held device. Such a hand held device may include a partitioned display panel provided with a plurality of simultaneously displayed viewing screens. Also, the hand held device may include a third transceiver for receiving the independently synchronized real-time audio and video data streams. Further, a processor may be communicatively coupled to the third transceiver and a memory may be communicatively coupled to the processor. Such a memory may include programmable software instructions that simultaneously play back the independently synchronized real-time audio and video data streams on the simultaneously displayed viewing screens.

The programmable software instructions preferably include and execute a control logic algorithm. Such control logic algorithm may include the first step of receiving the independently synchronized real-time audio and video data streams and identifying a number of the simultaneously displayed viewing screens. The control logic algorithm may include the second step of assigning a unique classification code to each of the simultaneously displayed viewing screens. The control logic algorithm may include the third step of determining a total quantity of the independently synchronized real-time audio and video data streams by counting a total quantity of the unique numerical priority codes received at the portable controller respectively.

If a total quantity of the unique classification codes is greater than a total quantity of the unique numerical priority codes, then the control logic algorithm simultaneously displays the independently synchronized real-time audio and video data streams on the simultaneously displayed viewing screens by assigning each of the unique numerical priority codes to a corresponding one of the unique classification codes respectively. If the total quantity of the unique classification codes is less than the total quantity of the unique numerical priority codes, then the control logic algorithm requests the user to select a limited quantity of the independently synchronized real-time audio and video data streams to be simultaneously displayed on the simultaneously displayed viewing screens.

The limited quantity of independently synchronized real-time audio and video data streams is not greater than the total quantity of the unique classification codes. The unique numerical priority codes are chronologically assigned to the unique classification codes as the detected dynamic triggering event passes through the unique viewing angles associated with the target zones so that the real-time developments of the detected dynamic triggering events is sequentially presented at adjacent ones of the simultaneously displayed viewing screens.

The portable security monitoring system may further include a global positioning satellite network in communication with the real-time audio and video information capturing mechanism for determining unique location coordinates of the detected dynamic triggering event and further for transmitting the unique location coordinates to the simultaneous playback mechanism respectively. Each of the unique location coordinates are preferably superimposed on a corresponding one of the simultaneously displayed viewing screens for conveniently assisting a user to easily learn about the real-time developments of the detected dynamic triggering event.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
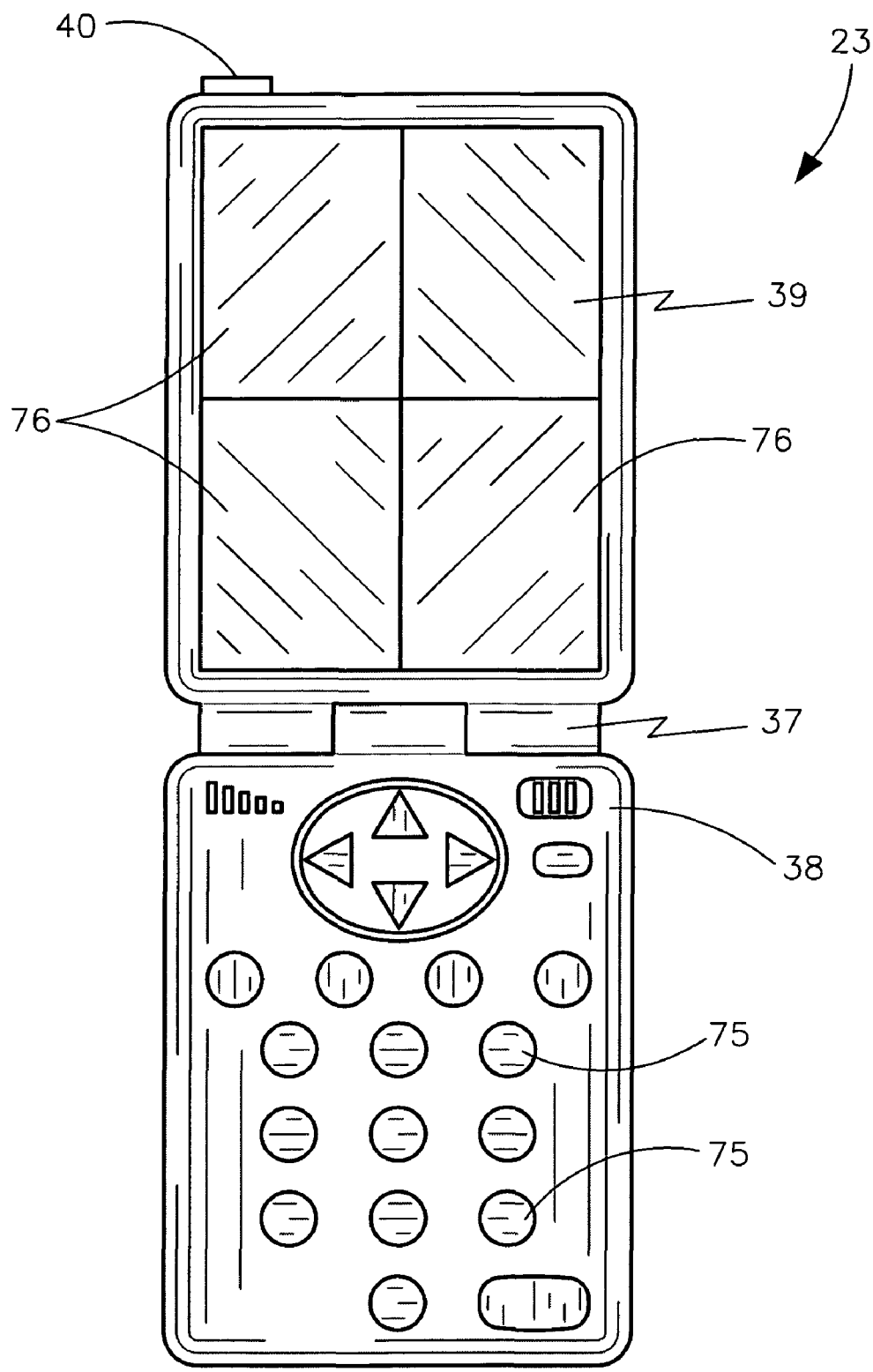
FIG. 1 is a front elevational view of the portable handheld device having multiple viewing screens in an open position.
Figure 2:
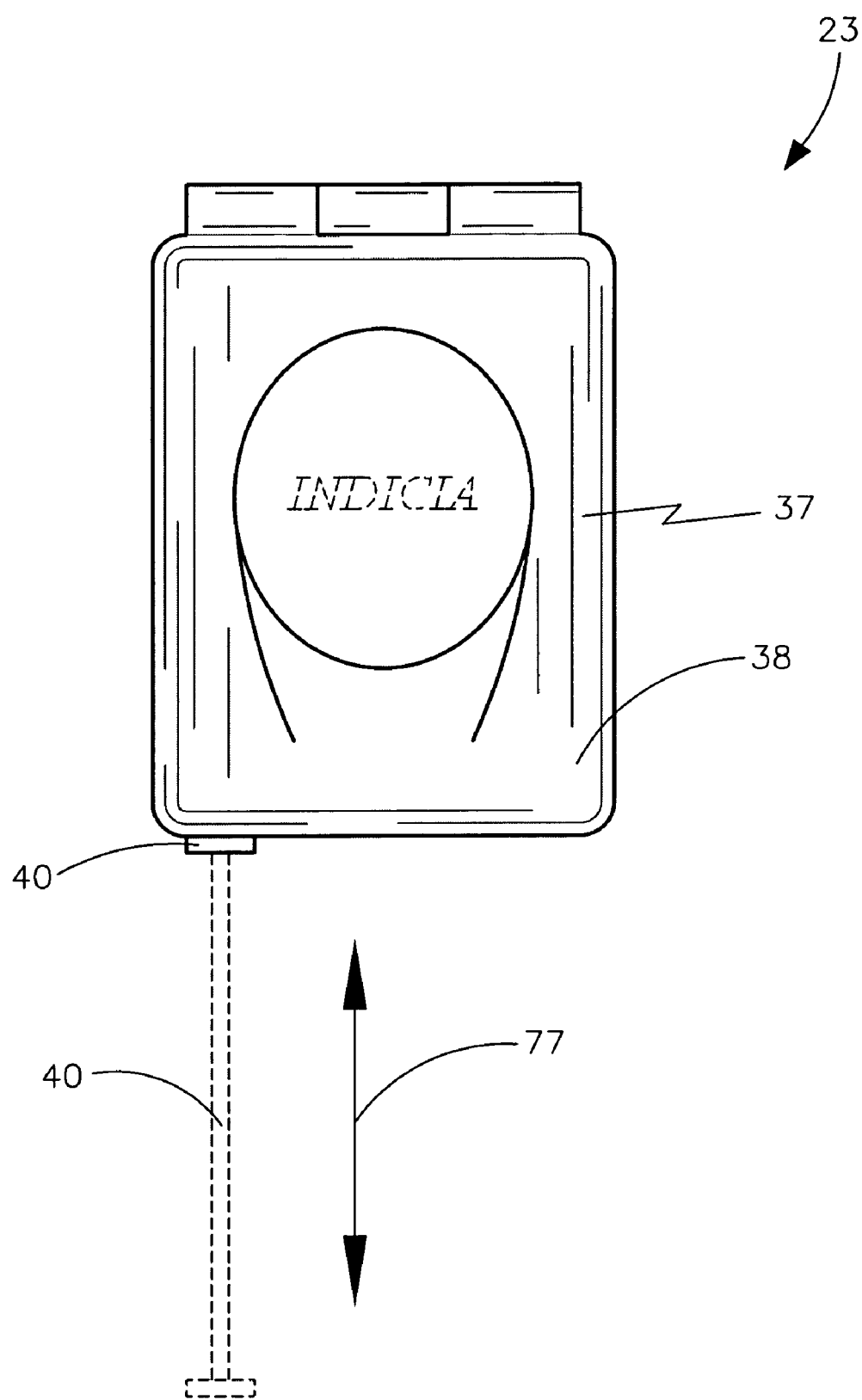
FIG. 2 is a front elevational view of the device in FIG. 1 in a closed position.
Figure 3:
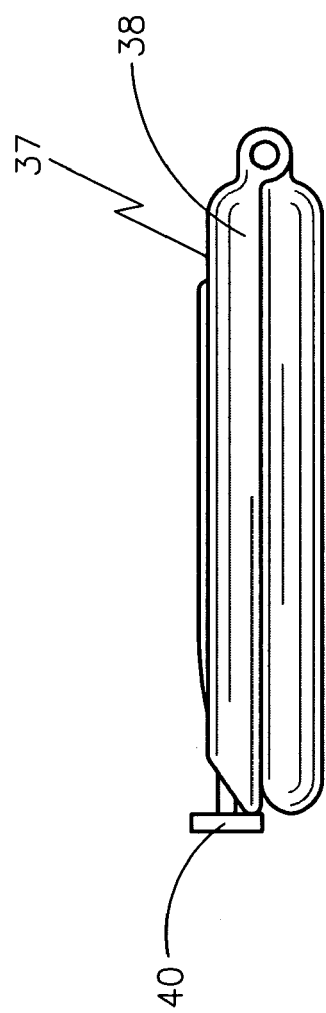
FIG. 3 is a side elevational view of the device in FIG. 1 in a closed position.
Figure 4:
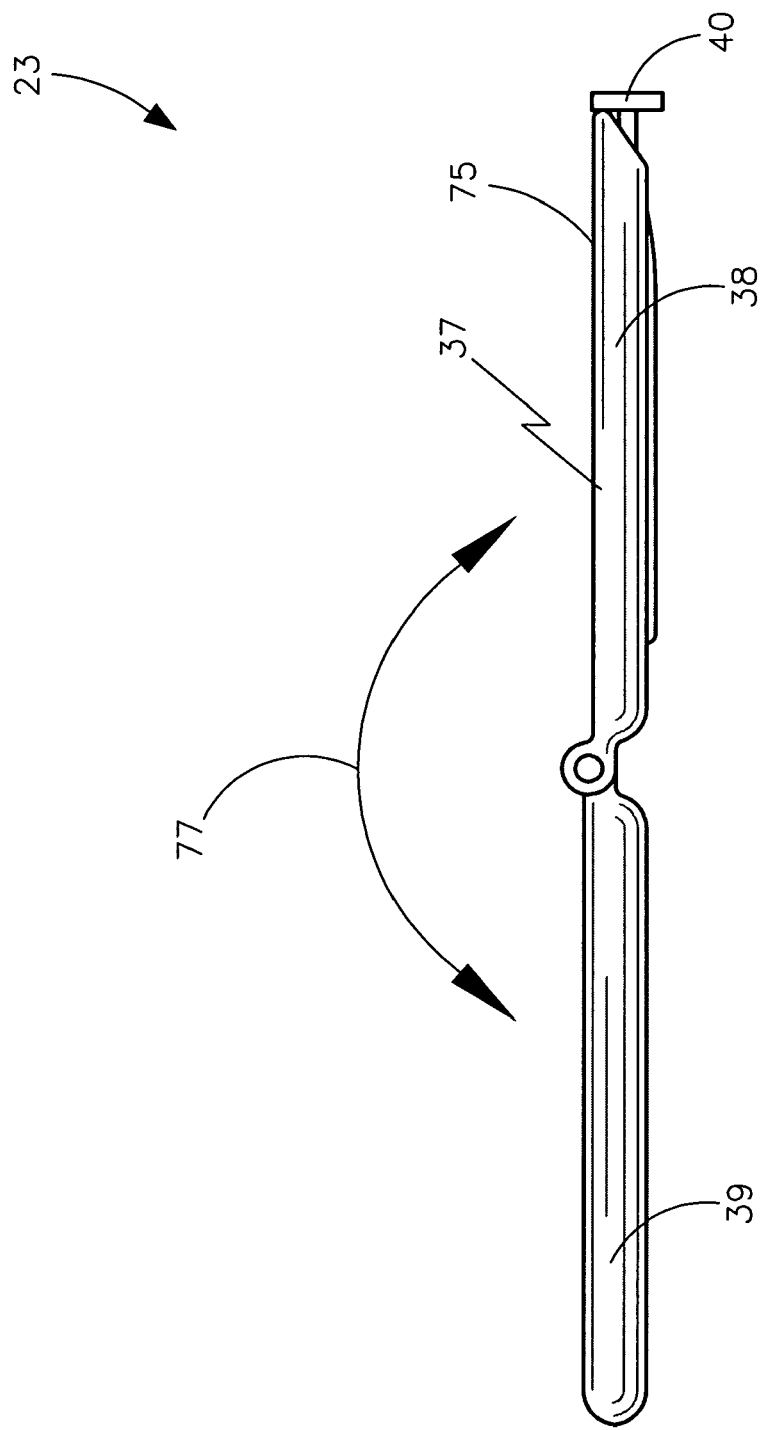
FIG. 4 is a side elevational view of the device in FIG. 1 in an open position.
Figure 5:
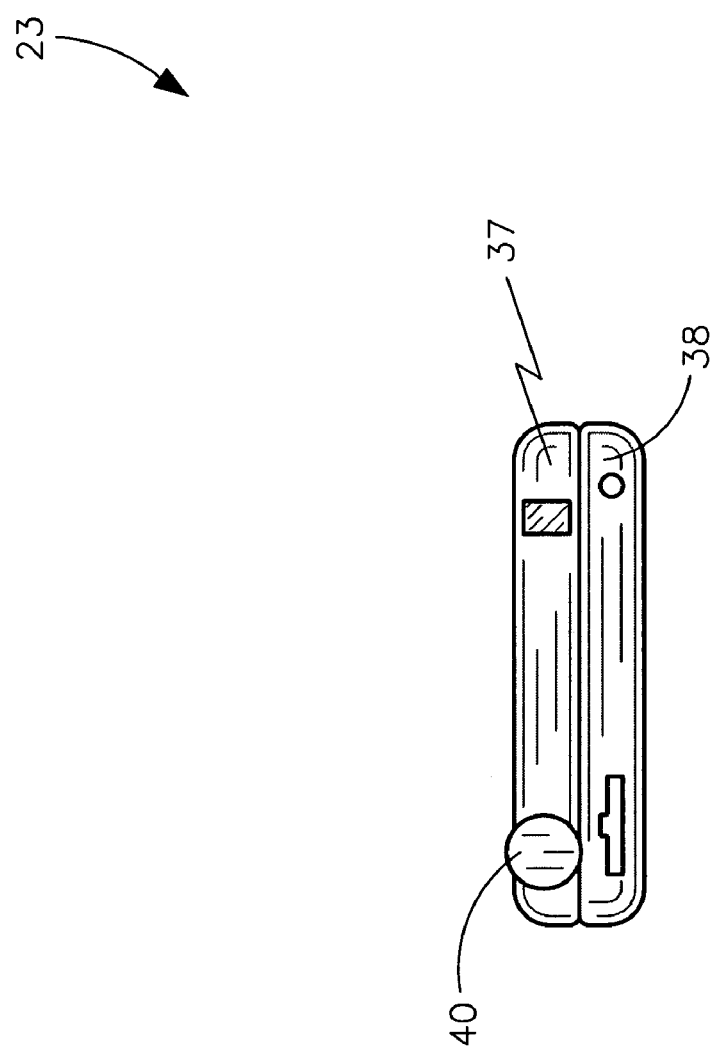
FIG. 5 is a top plan view of the device in FIG. 1 in a close position.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-13 by the reference numeral 10 and is intended to provide a portable security monitoring system for automatically detecting and tracking a dynamic triggering event occurring proximate to a first location and thereafter wirelessly reporting the dynamic triggering event to a remote second location. It should be understood that the system 10 may be used to protect many different locations and should not be limited in use to the applications mentioned herein. For example, the system 10 may be used to protect and monitor homes, warehouses, and storage garages, as well as automobiles.

Figure 11:
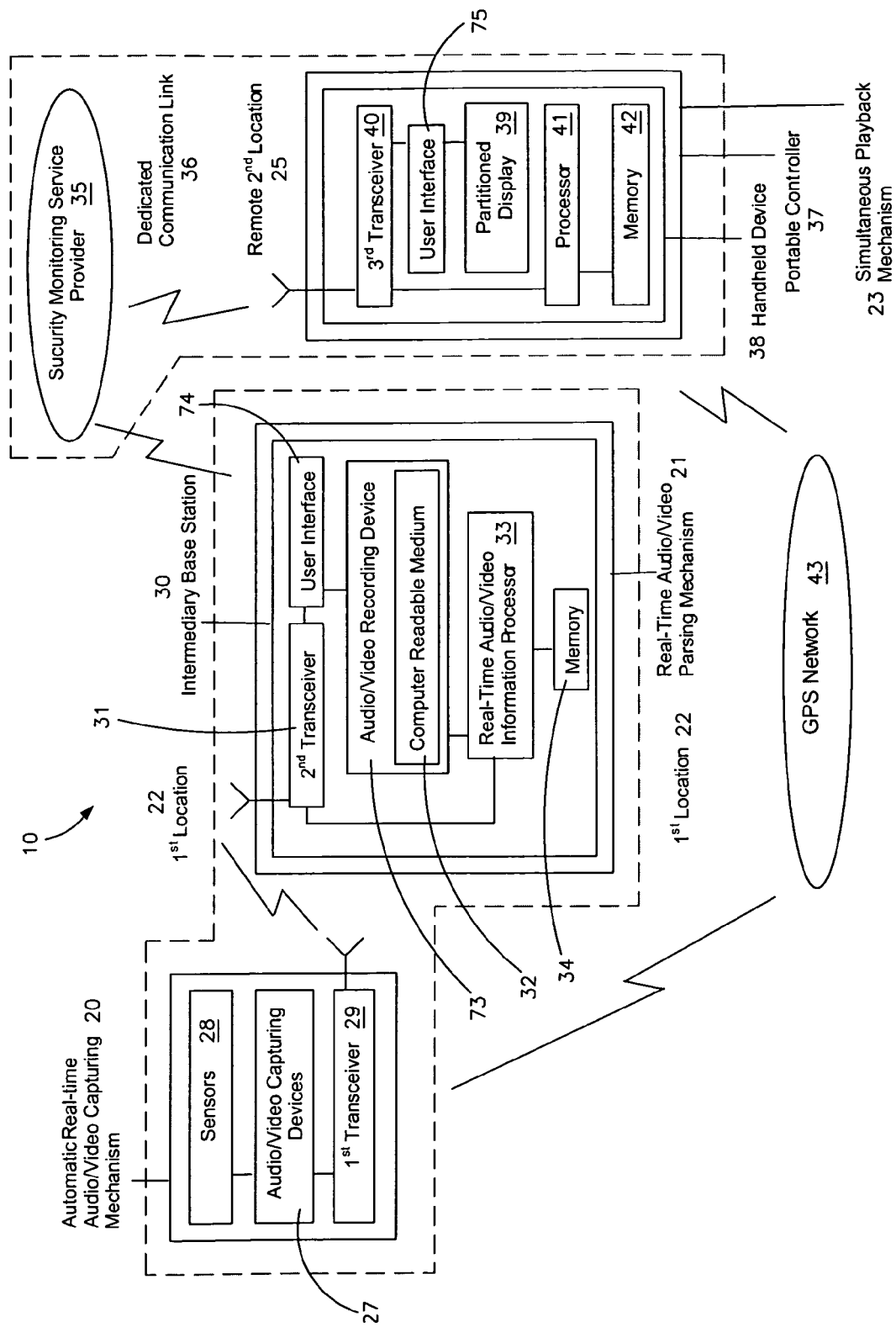
FIG. 11 is a schematic block diagram of a portable security monitoring system.

Referring initially to FIG. 11, the portable security monitoring system 10 may include a mechanism 20 for automatically capturing real-time audio and video information of the detected dynamic triggering event. The triggering event may be a sudden motion or sound. The system 10 may also include a mechanism 21 for parsing the real-time audio and video information into a plurality of independently synchronized real-time data streams uniquely associated with a plurality of corresponding target zones 26 defined at the first location 22 respectively.

The system 10 may further include a mechanism 23 for simultaneously playing back each of the independently synchronized real-time data streams so that the detected dynamic triggering event is displayed from a plurality of unique viewing angles 24 at the remote second location 25. The user of the viewing angles 24 vital for observing different aspects and perspectives of a particular triggering even. The viewing angles 24 are preferably associated with corresponding ones of the target zones 26 located at the first location 22 respectively.

The combined features of the mechanism 20 for automatically capturing real-time audio and video information and the mechanism 23 for simultaneously playing back each of the independently synchronized real-time data streams provide a benefit wherein a user in the remote second location 25 may observe the protected object at the first location 22.

For example, the user may employ the mechanism 20 for automatically capturing real-time audio and video information at the first location 22 in the user's parked automobile 11. If the vehicle is vandalized or stolen, movement from the perpetrators will trigger the system 10. The user will then receive an alert and may further use the system 10 to observe the first location 22 before returning to the automobile 11. In this manner, the user may discover whether the automobile 11 is in real danger or whether the alert is a false alarm.

Figure 13:
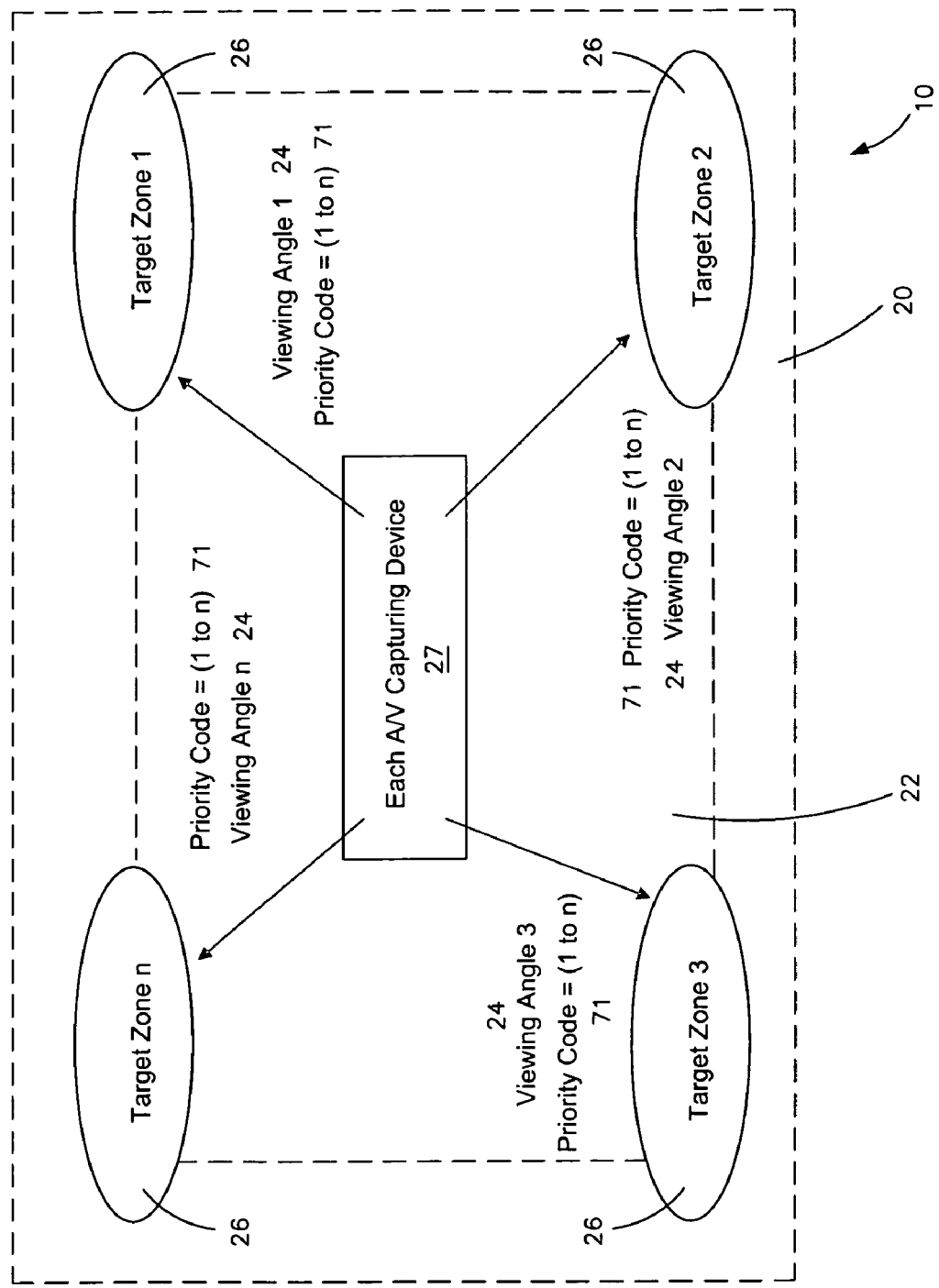
FIG. 13 is a schematic block diagram showing the relationship between the individual targets zones and each audio/video capturing device, in accordance with the present invention.

Referring to FIGS. 11 and 13, the target zones 26 may be mutually exclusive and defined proximate to the first location 22. The unique viewing angles 24 may be effectively configured in such a manner that a chronological and cumulative view of the target zones 26 is generated for permitting a user in the remote second location 25 to identify real-time developments of the detected dynamic triggering event in the first location 22. In this manner, the user may track a trespasser moving from one target zone 26 to the next.

Referring to FIGS. 6, 7, 8, and 11, the automatic real-time audio and video information capturing mechanism 20 preferably includes a plurality of portable real-time audio and video capturing devices 27 removably seated at the first location 22 for simultaneously capturing real-time audio information and real-time low speed video information of the detected dynamic triggering event. One skilled in the art understands that the portable real-time audio and video capturing devices 27 may be removably employed in a variety of applications. For example, the user may install the devices 27 in an automobile 11, thus ensuring the automobile remains safe while parked. Alternatively, the user may install the devices 27 in a retail business in order to monitor the entrance while the user is preoccupied in another area of the building.

Each of such real-time audio and video capturing devices 27 may advantageously maintain a continuous line of sight along a corresponding one of the unique viewing angles 24 so that each of the target zones 26 is monitored during the capturing process. Thus, a prospective trespasser or vandal in the first location 22 may not avoid detection by attempting to remain in the blind spot of one portable audio and video capturing device 27.

The audio and video capturing device 27 may also feature a digital camera 80, capable of rotating along circular path 81. A plurality of sensors 28 may be included for detecting the dynamic triggering event such as a sudden movement or other common stimuli. Such sensors 28 are preferably communicatively coupled to the real-time audio and video capturing devices 27 respectively.

Upon detection of the dynamic triggering event the sensors 28 may automatically generate and transmit an activation signal to the real-time audio and video capturing devices 27 for initializing a corresponding one of the capturing processes at the target zones 26 respectively. This is important so that each device 27 is only activated by the corresponding sensor 28. This feature prevents the devices 27 from continuously capturing real-time video and audio data.

A first transceiver 29 may be communicatively coupled to the real-time audio and video capturing devices 27 for transmitting the real-time audio and video information to the real-time audio and video information parsing mechanism 21.

Figure 10:
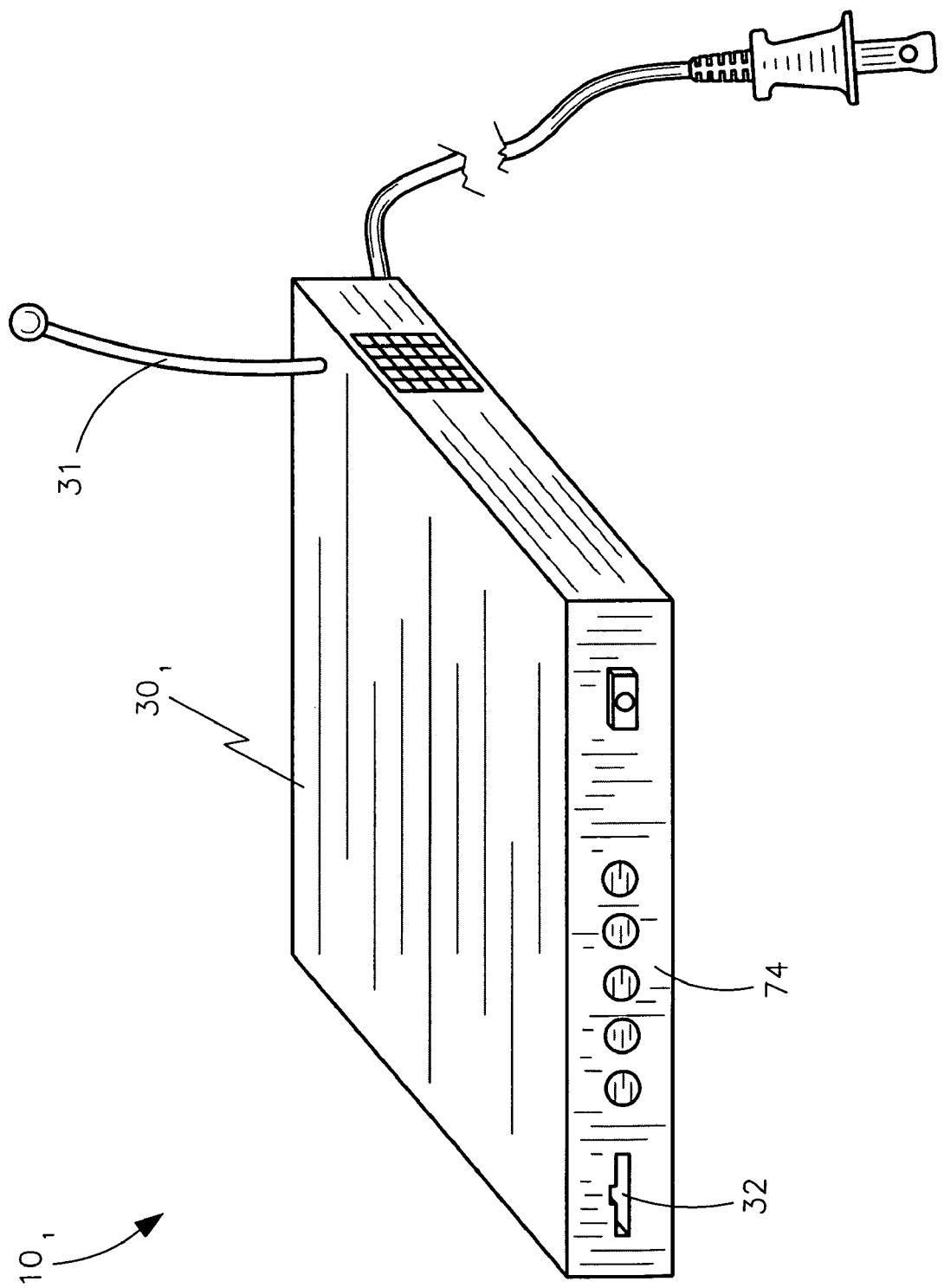
FIG. 10 is a perspective view of the intermediary base station.

Referring to FIGS. 10 and 11, the real-time audio and video information parsing mechanism 21 may include an intermediary base station 30 disposed at the first location 22 and communicatively coupled to the real-time audio and video capturing devices 27. Such an intermediary base station 30 may include a second transceiver 31 for receiving the real-time audio and video information from the first transceiver 29. The intermediary base station 30 may be stored in a discreet location away from the real-time audio and video capturing devices 27.

In an alternate embodiment of the system 10', as seen in FIG. 10, the base station 30 may be employed in a home or business and plugged into an existing power outlet.

Also, the base station 30 may include a recording device 73 with a removable computer-readable electronic medium 32 for recording the real-time audio and video information thereon. A user interface 74 may also be communicatively coupled to the second transceiver 31 and the recording device 73. This is vital so that the system 10 may record a triggering event even if the user is preoccupied and cannot view the event. This feature may further provide evidence for law enforcement authorities in the event of vandalism or theft.

The combined elements of the audio/video recording device 73 and the base station 20 being located away from the audio and video capturing devices 27 provide an unexpected benefit wherein the triggering event may be preserved even after the destruction of the audio and video capturing devices 27.

Further, the base station 30 may include a processor 33 communicatively coupled to the recording device 73 and a memory 34 communicatively coupled to the processor 33. Such a memory 34 preferably includes programmable software instructions that filter the real-time audio and video information into the independently synchronized real-time data streams.

The software instructions may include and execute a control logic algorithm. Such a control logic algorithm preferably includes the first step of receiving the real-time audio and video information and bifurcating the real-time audio and video information into separate real-time audio and video data streams. The control logic algorithm may include the second step of identifying a total quantity of the target zones 26 by identifying a matching total quantity of the unique viewing angles 24 associated with each of the real-time audio and video data streams respectively.

The control logic algorithm may include the third step of segmenting the real-time audio and video data streams into a plurality of unique real-time audio and video data streams associated with the total quantity of target zones 26 respectively. Further, the control logic algorithm may include the fourth step of chronologically assigning a unique numerical priority code to each of the unique real-time audio and video data streams according to a location of the associated target zones 26 respectively. In this manner, the user may listen as well as watch the triggering event in the first location 22.

Additionally, the control logic algorithm may include the fifth step of independently synchronizing corresponding ones of the unique real-time audio and video data streams by an increasing value of the unique numerical priority codes respectively. Finally, the control logic algorithm may include the sixth step of generating a plurality of output signals including each of the independently synchronized real-time audio and video data streams respectively. Additionally, the second transceiver 31 continuously transmits the output signals to the simultaneous playback mechanism 23.

Figure 12:
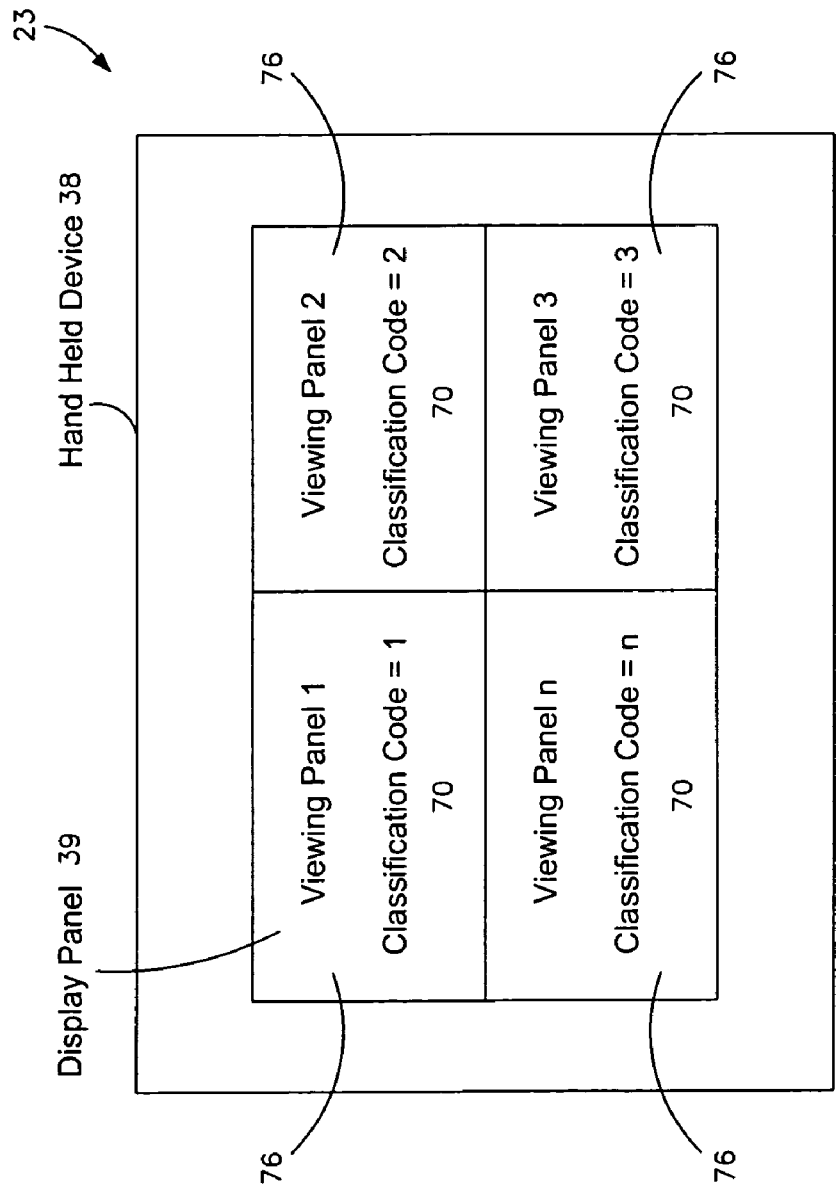
FIG. 12 is a schematic block diagram of the portable hand held device with the partitioned display screen.

Referring to FIGS. 11-13, the simultaneous playback mechanism 23 preferably includes a service provider 35 communicatively coupled to the real-time audio and video information parsing mechanism 21 for receiving the output signals from the second transceiver 31. The simultaneous playback mechanism 23 may also include a dedicated wireless communication link 36 associated with the service provider 35.

Further, the simultaneous playback mechanism 23 may include a portable controller 37 located at the remote second location 25 and communicatively coupled to the service provider 35 via the dedicated communication link 36. The service provider 35 may wirelessly transmit the independently synchronized real-time audio and video data streams over the dedicated communication link 36 to the portable controller 37.

The combined elements of the service provider 35 and the dedicated communication link 36 provide the benefit wherein a user may receive real-time audio and visual updates from the first location 22 regardless of the distance between the first 22 and second location 25. This feature is important for the user who leaves the state or country and desires to remotely survey a home, business, or automobile 11.

Referring to FIGS. 1, 2, 3, 4, 5, 11, and 12, the portable controller 37 may include a hand-held device 38. Such a hand held device 38 may include a user interface 75 communicatively coupled to a partitioned display panel 39 provided with a plurality of simultaneously displayed viewing screens 76. The plurality of simultaneous display screens 76 is crucial for allowing the user to observe trespassers moving from one target zone 26 to the next. The display panel 39 may be rotatably attached to the user interface 75 and rotate along an arcuate path 77 to toggle the hand held device 38 between and open position and a closed position. This feature provides the benefit of protecting the display panel 39 when not in use.

Also, the hand held device 38 may include a third transceiver 40 for receiving the independently synchronized real-time audio and video data streams. The third transceiver 40 may retract into and extend out of the hand held device 38 along a linear path 77, which is important for protecting the third transceiver 40 while being carried by the user.

Referring to FIGS. 11 and 12, a processor 41 may be communicatively coupled to the third transceiver 40 and a memory 42 may be communicatively coupled to the processor 41. Such a memory 42 may include programmable software instructions that simultaneously play back the independently synchronized real-time audio and video data streams on the simultaneously displayed viewing screens 76.

The programmable software instructions preferably include and execute a control logic algorithm. Such a control logic algorithm may include the first step of receiving the independently synchronized real-time audio and video data streams and identifying a number of the simultaneously displayed viewing screens 76. The control logic algorithm may include the second step of assigning a unique classification code 70 to each of the simultaneously displayed viewing screens 76. The control logic algorithm may include the third step of determining a total quantity of the independently synchronized real-time audio and video data streams by counting a total quantity of the unique numerical priority codes 71 received at the portable controller 37 respectively.

If a total quantity of the unique classification codes 70 is greater than a total quantity of the unique numerical priority codes 71, then the control logic algorithm simultaneously displays the independently synchronized real-time audio and video data streams on the simultaneously displayed viewing screens 76 by assigning each of the unique numerical priority codes 71 to a corresponding one of the unique classification codes 70 respectively. If the total quantity of the unique classification codes 70 is less than the total quantity of the unique numerical priority codes 71, then the control logic algorithm requests the user to select a limited quantity of the independently synchronized real-time audio and video data streams to be simultaneously displayed on the simultaneously displayed viewing screens 76.

The limited quantity of independently synchronized real-time audio and video data streams is not greater than the total quantity of the unique classification codes 70. The unique numerical priority codes 71 are chronologically assigned to the unique classification codes 70 as the detected dynamic triggering event passes through the unique viewing angles 24 associated with the target zones 26 so that the real-time developments of the detected dynamic triggering events is sequentially presented at adjacent ones of the simultaneously displayed viewing screens.

The portable security monitoring system 10 may further include a global positioning satellite network 43 in communication with the real-time audio and video information capturing mechanism 20 for determining unique location coordinates of the detected dynamic triggering event and further for transmitting the unique location coordinates to the simultaneous playback mechanism 23 respectively. Each of the unique location coordinates are preferably superimposed on a corresponding one of the simultaneously displayed viewing screens 76 for conveniently assisting a user to easily learn about the real-time developments of the detected dynamic triggering event.

Figure 6:
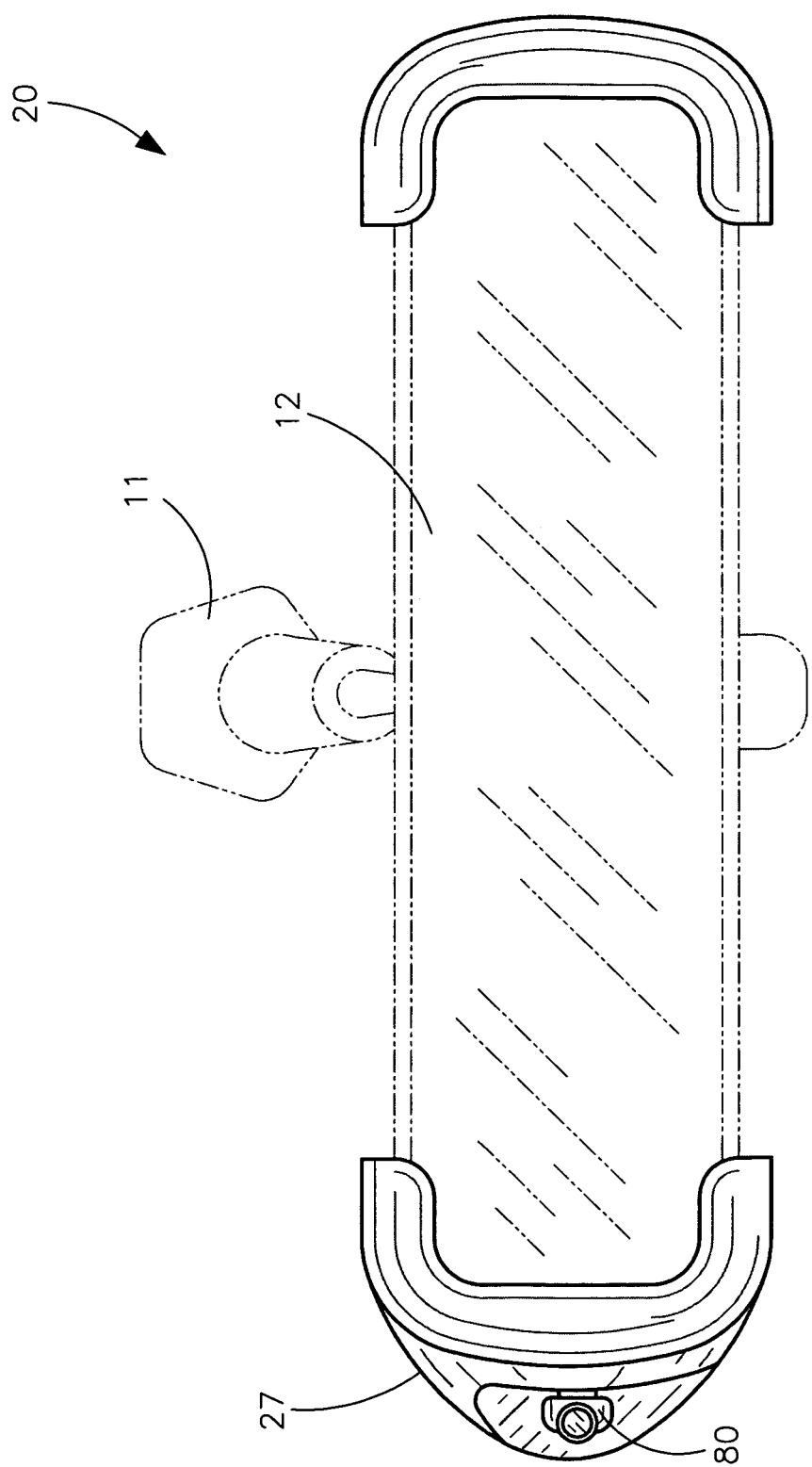
FIG. 6 is a front elevational view of one exemplary portable real-time audio and video capturing device removably attached to an existing automobile rear view mirror, in accordance with the preferred embodiment of the present invention.
Figure 7:
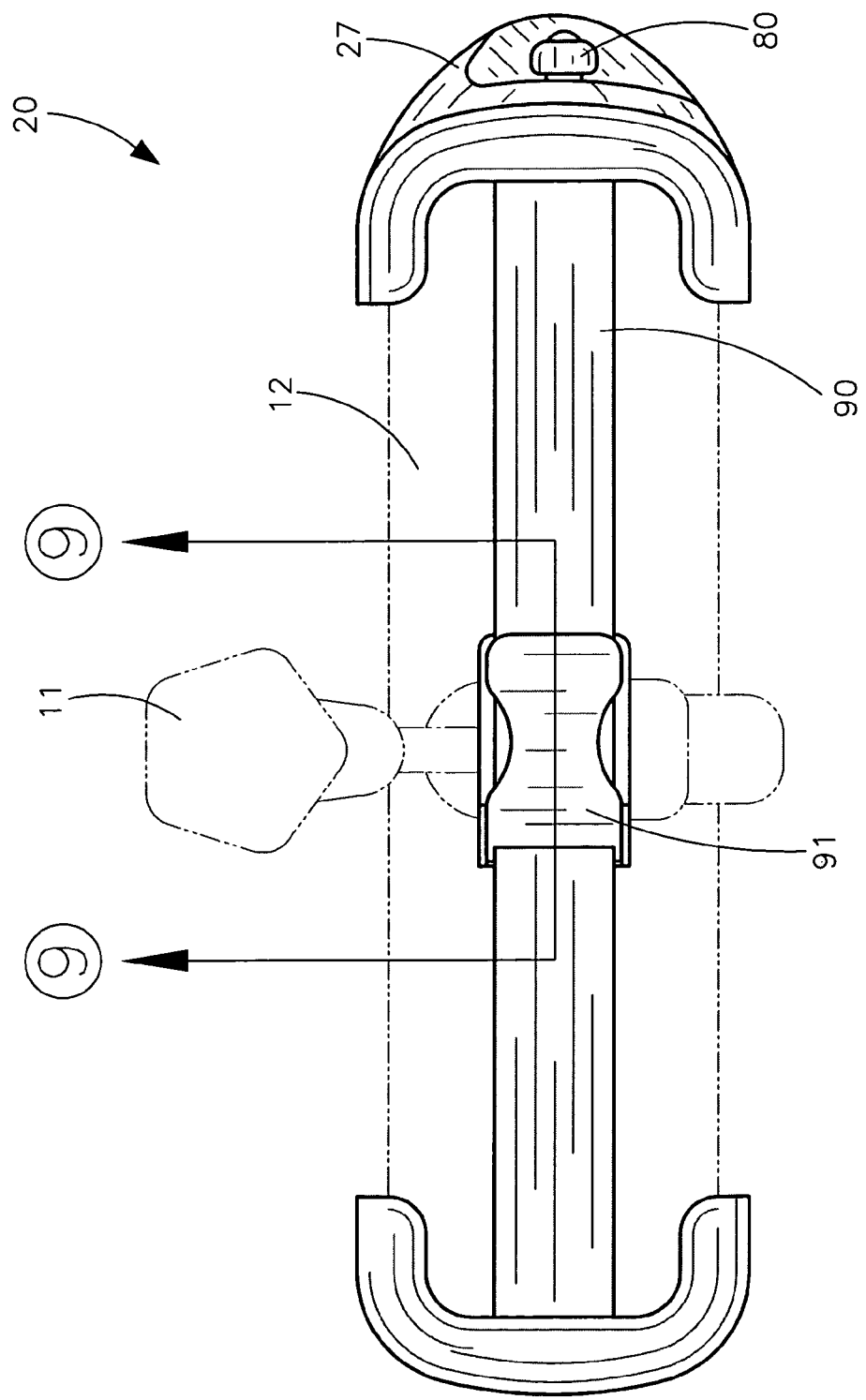
FIG. 7 is a real elevational view of the device in FIG. 6.
Figure 8:
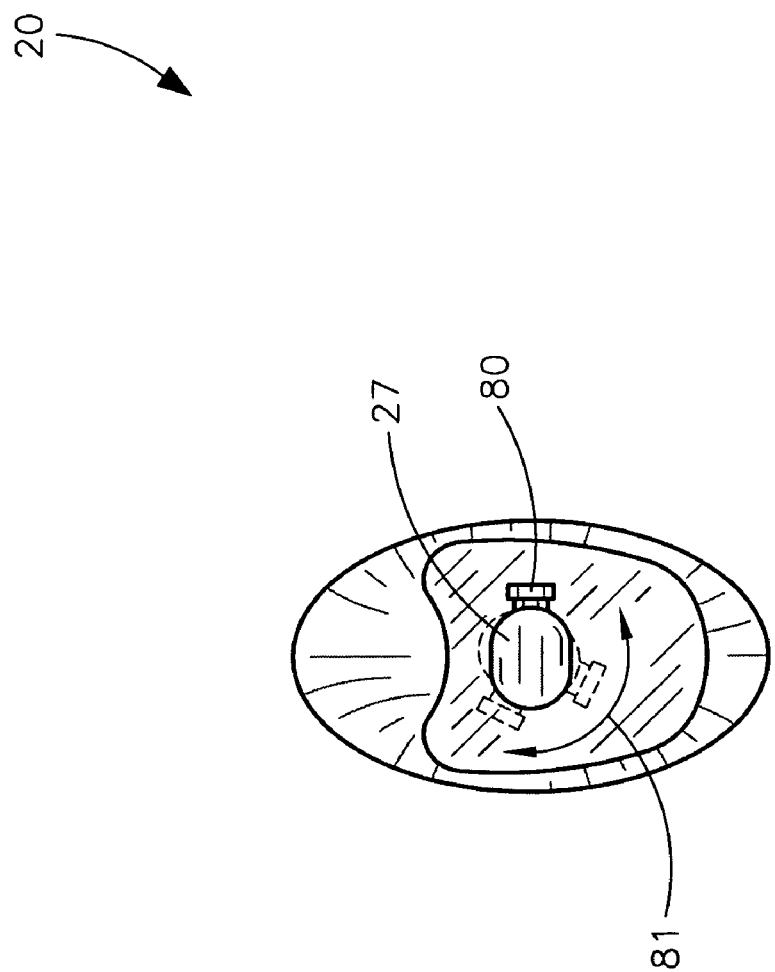
FIG. 8 is a side elevational view of the device in FIG. 6.
Figure 9B:
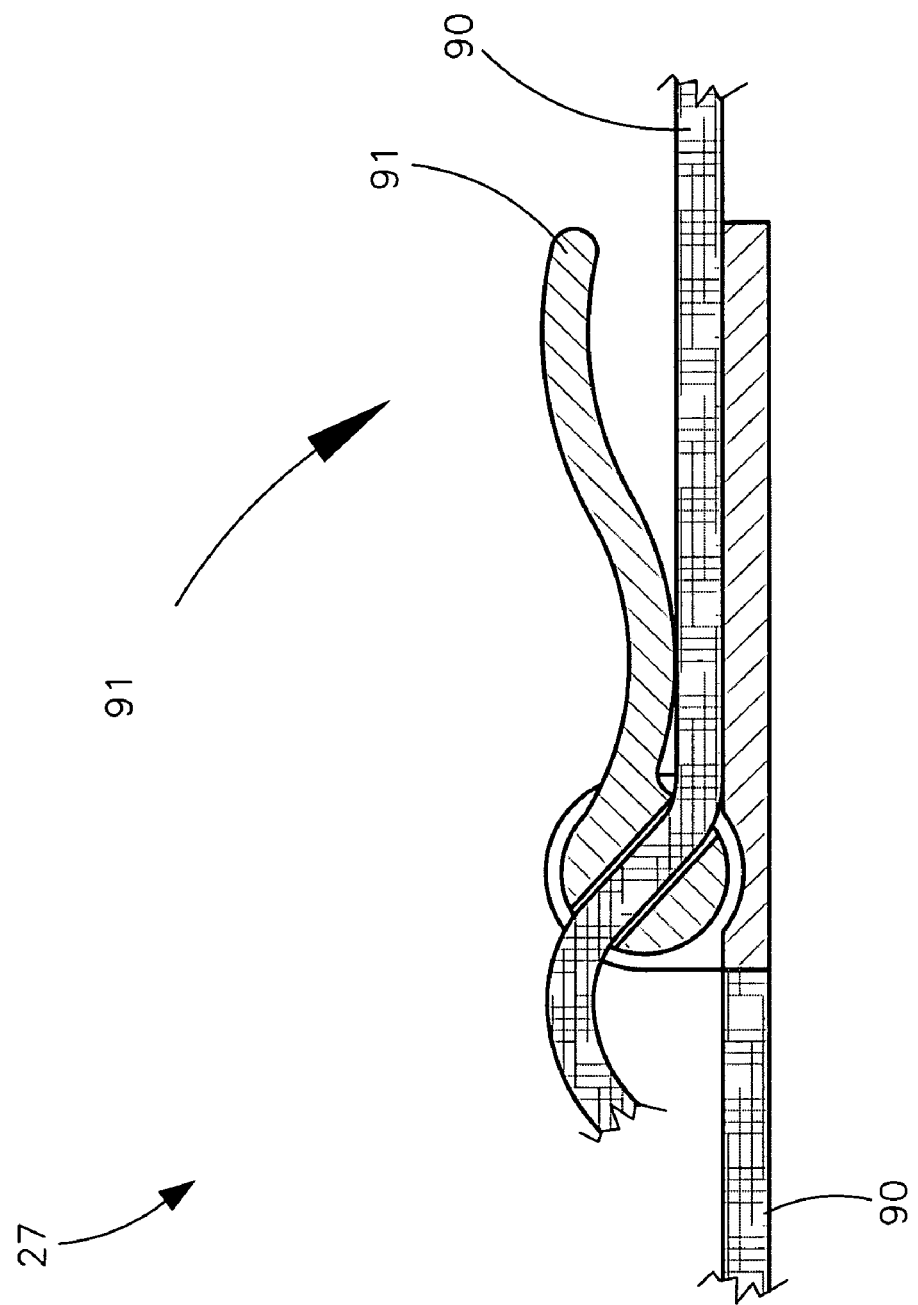
FIGS. 9a and 9a are cross sectional views, taken along line 9-9 in FIG. 7, of the strap and clasp securing the portable audio and video capturing device to the existing automobile.

Referring to FIGS. 6 and 6, In a preferred embodiment of the present invention, an object, such as an automobile 11, contains a mechanism 20 for automatically capturing real-time audio and video information of the detected dynamic triggering event provided with portable real-time audio and video capturing devices 27. The portable capturing devices 27 are most likely attached somewhere in the automobile 11, and may be situated within an internal compartment of the automobile 11. Further, the portable capturing device 27 may be removably attached to the automobile's rear view mirror 12 by a strap 90 so that it maintains a visible line of sight with the exterior surroundings of the automobile 11.

The a strap 90 may include a clasp 91 which is important for properly tensioning the strap 90 to secure the portable capturing device 27 to the automobile rear view mirror 12. The strap 90 is adjustable and may be adapted to fit automobile rear view mirrors of different sizes.

The portable capturing devices 27 are automatically actuated between operable and inoperable modes by a plurality of sensors 28 communicatively coupled thereto. Such sensors 28 may be responsive to motion, infrared, acoustic and other well known stimuli.

In addition, a real-time audio/video parsing mechanism 21 with an intermediary base station 30 is situated within the automobile. The intermediary base station 30 is preferably stored in a discrete location and may be communicatively linked into the automobile's Primary Computer Module. The intermediary base station 30 can either be connected to the power source associated with the object, such as the automobile battery, or it may have a self-contained power source or sources, as understood by one skilled in the art.

Upon receiving the audio/video signals, the automatic real-time audio/video capturing mechanism 27 communicates with the intermediary base station 30, which sends a page to a paging satellite preferably monitored by personnel or some automatic device located at the service provider 35. The page request can be manually actuated by a user seated in the automobile or remotely actuated by a hand-held device 38, for example. Upon receipt of the page request, the service provider 35 may transmit encoded warning signals for notifying a local law enforcement agency of the triggering event at the automobile. For example, a police station or fire station may receive the warning signals from the service provider 35.

In addition, the service provider 35 sends an instruction signal to the intermediary base station 30, which authorizes the automatic real-time audio/video capturing mechanism 20 to communicate with a global positioning satellite network 43 and identify a location of the automobile, for example. The global positioning satellite network 43 communicates with the automatic real-time audio/video capturing mechanism 20 and reports the location of the automobile to the hand-held device 38. The hand-held receiver's 38 response is to communicate the location of the automobile to the service provider 35 for transmission to the local law enforcement agency, for example.

In an exemplary embodiment, the page need not originate in the automatic real-time audio/video capturing mechanism 20 but can originate in any system capable of sending out pages. For example, a cellular network, employed by the hand-held device 38, may be capable of sending out pages and could be used instead of the automatic real-time audio/video capturing mechanism 20. Further, the system 10 need not use a page to communicate between the service provider 35, the intermediary base station 30, the hand-held device 38 and the automatic real-time audio/video capturing mechanism 20 but can use any system that allows the service provider 35 to uniquely address the system 10 via a broadcast signal. For example, very low frequency signals or HF radio signals could be used to communicate between the service provider 35 and the system 10.

The service provider 35 may also directly access the signals of the GPS network 43, which comprises a plurality of satellites broadcasting signals which can be used to determine an object's location heading anywhere on the earth, as well known in the industry. The GPS network then formats the location information into a cellular telemetry stream and transmits it via the cellular system's telemetry channels. Advantageously, the GPS network 43, for example, can manually communicate the location of the automobile to the end user via the conventional hand-held device 38, which may operate via a cellular telephone system, for example.

In the AMPS (Advanced Mobile Phone System) cellular system, which is the analog cellular system used in the United States, each cellular base station has 832 channels. The 832 channels are divided among at least two competing cellular carriers. Each cellular carrier uses 21 of the 416 channels to carrying control signals. Each control channel includes a Forward Control Channel (FOCC) and a Reverse Control Channel (RECC).

The cellular base station uses the FOCC to send information to cellular telephones and the cellular telephones send information back to the cellular base station via the RECC. The FOCC and RECC are used to establish a cellular telephone call through a local switch. Once the cellular telephone call is established, the call is moved to one of the non-control channels and the released control channel is made available to establish other cellular telephone calls.

The cellular base station broadcasts a System Identification ("SID") signal, which identifies the cellular system to cellular telephones receiving it. When a cellular telephone is turned on, it compares the SID signal it receives against a SID stored within the telephone, which identifies the cellular telephone's home system. If the received SID is not the same as the stored SID, the cellular telephone is "roaming" and the "roam" indicator on the telephone is illuminated.

Subsequently, the cellular telephone transmits its identity to the cellular base station via the RECC. The RECC transmission includes the telephone's Mobile Identification Number ("MIN"), which is a unique 10-digit number (analogous to a telephone number including an area code) that is programmed into the cellular telephone. The first six digits of the MIN identify the cellular telephone's home system. The RECC also includes an Electronic Serial Number ("ESN"), a unique 32-bit serial number permanently stored in the cellular telephone which uniquely identifies the cellular telephone. The cellular base station will receive the MIN and ESN through the RECC and determine that the MIN does not correspond to a local number. Using the MIN, the cellular base station will determine the home system for the cellular telephone and send a validation signal to that system. The cellular local switches in the United States are interconnected through the Intersystem Signaling Network, IS-41, which allows them to send and receive validation information.

The validation signal, known under IS-41 as a Registration/Notification Invoke (REGNOT) message, includes the cellular telephone's MIN and ESN. The REGNOT message also includes the identity of the cellular base station sending the message. The cellular telephone's home system will respond with a Registration/Notification Return Result (REGNOT) message. In the REGNOT message, the cellular telephone's home system will either indicate that it will take financial responsibility for calls made by the cellular telephone or it will refuse to validate the cellular telephone. If validation occurs, a subsequent exchange of messages establishes the features (such as call forwarding) available to the cellular telephone.

The validation process just described uses the cellular system's control channels. Again, once a cellular telephone call is initiated the control channel that was used to set up the call is released for other purposes.

Upon receipt of the GPS signals from the service provider 35, the hand-held device 38 tracks the location and direction of movement, if any, of the automobile using the GPS signals. The hand-held device 38 then formats the location and movement information into the payload portion of a cellular RECC signal and transmit it to a local cellular base station. The MIN portion of the RECC signal may contain a unique MIN or it may be a MIN that is common to all triggerable location-reporting device serviced by the service provider 35, which can again relay the automobile location to the law enforcement agency. Alternatively, the MIN may be different for each system 10.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable security monitoring system for automatically detecting and tracking a dynamic triggering event occurring proximate to a first location and thereafter wirelessly reporting the dynamic triggering event to a remote second location, said portable security monitoring system comprising:

means for automatically capturing real-time audio and video information of the detected dynamic triggering event;

means for parsing said real-time audio and video information into a plurality of independently synchronized real-time data streams uniquely associated with a plurality of corresponding target zones defined at the first location respectively; and means for simultaneously playing back each of said independently synchronized real-time data streams so that the detected dynamic triggering event is displayed from a plurality of unique viewing angles at the remote second location, said unique viewing angles being associated with corresponding ones of said target zones;

wherein said unique viewing angles are configured in such a manner that a chronological and cumulative view of said target zones is generated for permitting a user to identify real-time developments of the detected dynamic triggering event;

wherein said automatic real-time audio and video information capturing means comprises:

a plurality of portable real-time audio and video capturing devices removably seated at the first location for simultaneously capturing real-time audio information and real-time low speed video information of the detected dynamic triggering event, each of said real-time audio and video capturing devices maintaining a continuous line of sight along a corresponding one of said unique viewing angles so that each of said target zones are monitored during capturing processes;

a plurality of sensors for detecting the dynamic triggering event, said sensors being communicatively coupled to said real-time audio and video capturing devices respectively, upon detection of the dynamic triggering event said sensors automatically generating and transmitting an activation signal to said real-time audio and video capturing devices for initializing a corresponding one of the capturing processes at said target zones respectively; and a first transceiver communicatively coupled to said real-time audio and video capturing devices for transmitting said real-time audio and video information to said real-time audio and video information parsing means;

wherein said real-time audio and video information parsing means comprises: an intermediary base station disposed at the first location and communicatively coupled to said real-time audio and video capturing devices, said intermediary base station comprising a second transceiver for receiving said real-time audio and video information from said first transceiver;

a recording device including a removable computer-readable electronic medium for recording said real-time audio and video information thereon;

a processor communicatively coupled to said recording device; and a memory communicatively coupled to said processor, said memory including programmable software instructions that filters said real-time audio and video information into said independently synchronized real-time data streams, said software instructions including and executing a control logic algorithm including the steps of a. receiving said real-time audio and video information, b. bifurcating said real-time audio and video information into separate real-time audio and video data streams, c. identifying a total quantity of said target zones by identifying a matching total quantity of said unique viewing angles associated with each of said real-time audio and video data streams respectively, d. segmenting said real-time audio and video data streams into a plurality of unique real-time audio and video data streams associated with said total quantity of target zones respectively, e. chronologically assigning a unique numerical priority code to each of said unique real-time audio and video data streams according to a location of said associated target zones respectively, f. independently synchronizing corresponding ones of said unique real-time audio and video data streams by an increasing value of said unique numerical priority codes respectively, and g. generating a plurality of output signals containing each of said independently synchronized real-time audio and video data streams respectively;

wherein said second transceiver continuously transmits said output signals to said simultaneous playback means;

wherein said simultaneous playback means comprises:

a service provider communicatively coupled to said real-time audio and video information parsing means for receiving said output signals from said second transceiver;

a dedicated wireless communication link associated with said service provider; and a portable controller located at the remote second location and being communicatively coupled to said service provider via said dedicated communication link;

wherein said service provider wirelessly transmits said independently synchronized real-time audio and video data streams over said dedicated communication link to said portable controller.

2. The portable security monitoring system of claim 1, wherein said portable controller comprises: a hand-held device comprising a partitioned display panel provided with a plurality of simultaneously displayed viewing screens;

a third transceiver for receiving said independently synchronized real-time audio and video data streams;

a processor communicatively coupled to said third transceiver;

a memory communicatively to said processor and including programmable software instructions that simultaneously plays back said independently synchronized real-time audio and video data streams on said simultaneously displayed viewing screens, said programmable software instructions including and executing a control logic algorithm including the steps of a. receiving said independently synchronized real-time audio and video data streams, b. identifying a number of said simultaneously displayed viewing screens, c. assigning a unique classification code to each of said simultaneously displayed viewing screens, d. determining a total quantity of said independently synchronized real-time audio and video data streams by counting a total quantity of said unique numerical priority codes received at said portable controller respectively, e. if a total quantity of said unique classification codes is greater than a total quantity of said unique numerical priority codes, then simultaneously displaying said independently synchronized real-time audio and video data streams on said simultaneously displayed viewing screens by assigning each of said unique numerical priority codes to a corresponding one of said unique classification codes respectively, and f. if said total quantity of said unique classification codes is less than said total quantity of said unique numerical priority codes, then requesting the user to select a limited quantity of said independently synchronized real-time audio and video data streams to be simultaneously displayed on said simultaneously displayed viewing screens.

3. The portable security monitoring system of claim 2, wherein said limited quantity of independently synchronized real-time audio and video data streams is not greater than said total quantity of the unique classification codes;

wherein said unique numerical priority codes are chronologically assigned to said unique classification codes as the detected dynamic triggering event passes through said unique viewing angles associated with said target zones so that the real-time developments of the detected dynamic triggering events is sequentially presented at adjacent ones of said simultaneously displayed viewing screens.

4. The portable security monitoring system of claim 3, further comprising:

a global positioning satellite network in communication with said real-time audio and video information capturing means for determining unique location coordinates of the detected dynamic triggering event and further for transmitting said unique location coordinates to said simultaneous playback means respectively;

wherein each of said unique location coordinates are superimposed on a corresponding one of said simultaneously displayed viewing screens for assisting a user to easily learn about the real-time developments of the detected dynamic triggering event.

5. A portable security monitoring system for automatically detecting and tracking a dynamic triggering event occurring proximate to a first location and thereafter wirelessly reporting the dynamic triggering event to a remote second location, said portable security monitoring system comprising:

means for automatically capturing real-time audio and video information of the detected dynamic triggering event;

means for parsing said real-time audio and video information into a plurality of independently synchronized real-time data streams uniquely associated with a plurality of corresponding target zones defined at the first location respectively; and means for simultaneously playing back each of said independently synchronized real-time data streams so that the detected dynamic triggering event is displayed from a plurality of unique viewing angles at the remote second location, said unique viewing angles being associated with corresponding ones of said target zones at the first location respectively, said target zones being mutually exclusive and defined proximate to the first location;

wherein said unique viewing angles are configured in such a manner that a chronological and cumulative view of said target zones is generated for permitting a user to identify real-time developments of the detected dynamic triggering event;

wherein said automatic real-time audio and video information capturing means comprises:

a plurality of portable real-time audio and video capturing devices removably seated at the first location for simultaneously capturing real-time audio information and real-time low speed video information of the detected dynamic triggering event, each of said real-time audio and video capturing devices maintaining a continuous line of sight along a corresponding one of said unique viewing angles so that each of said target zones are monitored during capturing processes;

a plurality of sensors for detecting the dynamic triggering event, said sensors being communicatively coupled to said real-time audio and video capturing devices respectively, upon detection of the dynamic triggering event said sensors automatically generating and transmitting an activation signal to said real-time audio and video capturing devices for initializing a corresponding one of the capturing processes at said target zones respectively; and a first transceiver communicatively coupled to said real-time audio and video capturing devices for transmitting said real-time audio and video information to said real-time audio and video information parsing means;

wherein said real-time audio and video information parsing means comprises: an intermediary base station disposed at the first location and communicatively coupled to said real-time audio and video capturing devices, said intermediary base station comprising a second transceiver for receiving said real-time audio and video information from said first transceiver;

a recording device including a removable computer-readable electronic medium for recording said real-time audio and video information thereon;

a processor communicatively coupled to said recording device; and a memory communicatively coupled to said processor, said memory including programmable software instructions that filters said real-time audio and video information into said independently synchronized real-time data streams, said software instructions including and executing a control logic algorithm including the steps of h. receiving said real-time audio and video information, i. bifurcating said real-time audio and video information into separate real-time audio and video data streams, j. identifying a total quantity of said target zones by identifying a matching total quantity of said unique viewing angles associated with each of said real-time audio and video data streams respectively, k. segmenting said real-time audio and video data streams into a plurality of unique real-time audio and video data streams associated with said total quantity of target zones respectively, l. chronologically assigning a unique numerical priority code to each of said unique real-time audio and video data streams according to a location of said associated target zones respectively, m. independently synchronizing corresponding ones of said unique real-time audio and video data streams by an increasing value of said unique numerical priority codes respectively, and n. generating a plurality of output signals containing each of said independently synchronized real-time audio and video data streams respectively;

wherein said second transceiver continuously transmits said output signals to said simultaneous playback means;

wherein said simultaneous playback means comprises:

a service provider communicatively coupled to said real-time audio and video information parsing means for receiving said output signals from said second transceiver;

a dedicated wireless communication link associated with said service provider; and a portable controller located at the remote second location and being communicatively coupled to said service provider via said dedicated communication link;

wherein said service provider wirelessly transmits said independently synchronized real-time audio and video data streams over said dedicated communication link to said portable controller.

6. The portable security monitoring system of claim 5, wherein said portable controller comprises: a hand-held device comprising a partitioned display panel provided with a plurality of simultaneously displayed viewing screens;

a third transceiver for receiving said independently synchronized real-time audio and video data streams;

a processor communicatively coupled to said third transceiver;

a memory communicatively to said processor and including programmable software instructions that simultaneously plays back said independently synchronized real-time audio and video data streams on said simultaneously displayed viewing screens, said programmable software instructions including and executing a control logic algorithm including the steps of g. receiving said independently synchronized real-time audio and video data streams, h. identifying a number of said simultaneously displayed viewing screens, i. assigning a unique classification code to each of said simultaneously displayed viewing screens,
j. determining a total quantity of said independently synchronized real-time audio and video data streams by counting a total quantity of said unique numerical priority codes received at said portable controller respectively,
k. if a total quantity of said unique classification codes is greater than a total quantity of said unique numerical priority codes, then simultaneously displaying said independently synchronized real-time audio and video data streams on said simultaneously displayed viewing screens by assigning each of said unique numerical priority codes to a corresponding one of said unique classification codes respectively, and
l. if said total quantity of said unique classification codes is less than said total quantity of said unique numerical priority codes, then requesting the user to select a limited quantity of said independently synchronized real-time audio and video data streams to be simultaneously displayed on said simultaneously displayed viewing screens.

7. The portable security monitoring system of claim 6, wherein said limited quantity of independently synchronized real-time audio and video data streams is not greater than said total quantity of the unique classification codes;
wherein said unique numerical priority codes are chronologically assigned to said unique classification codes as the detected dynamic triggering event passes through said unique viewing angles associated with said target zones so that the real-time developments of the detected dynamic triggering events is sequentially presented at adjacent ones of said simultaneously displayed viewing screens.

8. The portable security monitoring system of claim 7, further comprising:
a global positioning satellite network in communication with said real-time audio and video information capturing means for determining unique location coordinates of the detected dynamic triggering event and further for transmitting said unique location coordinates to said simultaneous playback means respectively;
wherein each of said unique location coordinates are superimposed on a corresponding one of said simultaneously displayed viewing screens for assisting a user to easily learn about the real-time developments of the detected dynamic triggering event.

* * * * *